Aug. 5, 1969     J. J. BOYD     3,459,008

CHAIN COUPLING

Filed Nov. 2, 1967     2 Sheets-Sheet 1

INVENTOR.
JOSEPH J. BOYD
BY *Newton, Hopkins,*
*Jones & Ormsby*
ATTORNEYS

Aug. 5, 1969    J. J. BOYD    3,459,008
CHAIN COUPLING
Filed Nov. 2, 1967    2 Sheets-Sheet 2

INVENTOR.
JOSEPH J. BOYD
BY Newton, Hopkins,
Jones & Ormsby
ATTORNEYS

United States Patent Office 3,459,008
Patented Aug. 5, 1969

3,459,008
CHAIN COUPLING
Joseph J. Boyd, 96 Elder St., Fairburn, Ga. 30213
Filed Nov. 2, 1967, Ser. No. 680,113
Int. Cl. F16d 3/54
U.S. Cl. 64—19    7 Claims

ABSTRACT OF THE DISCLOSURE

A chain coupling for connecting together a driving and a driven shaft. The coupling includes a first sprocket connected to the driving shaft and having alternate ones of its teeth left out to form spaces between its teeth, a second sprocket connected to the driven shaft and also having alternate ones of its teeth left out to form spaces between its teeth, the sprockets fitted together with their teeth positioned in the spaces of the opposite sprocket, and a single strand roller chain positioned about the teeth of both sprockets, thereby holding the sprockets in their engaged position.

Background of the invention

When a machine and its driven unit are in line with each other, their shafts are usually connected by a coupling, such as a solid or rigid coupling, or a chain coupling or other type flexible coupling. When the machine and its driven unit are first assembled, it might be possible to arrange their shafts in nearly perfect alignment, but only with considerable time and effort. As the machine is operated, temperature changes, bearing wear, foundation settling, vibration, and normal shock loads tend to increase misalignment of the shafts. Thus, it is usually desirable to utilize a flexible coupling between the shafts to compensate for shaft misalignment, vibrations, and other factors.

Chain couplings are inexpensive and have been found to be effective in compensating for shaft misalignment between driving and driven shafts. The clearance between the sprocket teeth and the chain is sufficient enough to permit a small amount of shaft misalignment under normal operating conditions, including angular misalignment, axial misalignment, and parallel shaft misalignment, or shaft end-float. The conventional chain coupling comprises a pair of sprockets positioned in substantially axial alignment with each other, one sprocket being connected to the driving shaft and the other sprocket being connected to the driven shaft, and a double strand or double roller chain positioned about the teeth of the sprocket. When the coupling is operated, the teeth of the driving sprocket engage the chain rollers of a first strand of the chain, the connecting pins transmit the forces from the first strand of the chain to the second strand of the chain which is extended over the driven shaft, and the rollers of the second strand transmit the forces from the connecting pins to the teeth of the driven shaft. The arrangement is such that the connecting pins extending between the strands of the chain function to transmit substantially all of the forces between the two shafts. Of course, the connecting pins tend to bend and warp with prolonged wear, and eventually shear in their areas between the strands of the chain. Thus, the small diameter connecting pins are the weakest point in the chain coupling.

Summary of the invention

This invention comprises a chain coupling which utilizes a single strand roller chain extending about a pair of sprockets. The sprockets are formed with alternate ones of their teeth removed, and the sprockets are placed in abutting relationship with each other, with their teeth fitting into the spaces between the teeth of the opposite sprocket. Thus, the teeth of both sprockets are positioned in a common plane, as if they were a single sprocket, and a single strand chain is positioned about the sprockets and fastened into place to enclose the sprocket. Of course, the side links of the chain maintain the teeth of the sprockets properly located. The teeth of the driving sprocket push the roller of the chain ahead of it, and the rollers each push a tooth of the driven sprocket next ahead of it. Thus, only alternate ones of the rollers are engaged by the teeth of the sprockets as the sprockets are operated in one direction. When the driving sprocket operates in the opposite direction, its teeth will engage the other rollers, and these rollers will engage the teeth of the driven sprocket. Thus, regardless of which direction the driving sprocket moves the coupling, the force transmitted between the driving and driven sprockets will be transmitted by the teeth of the driving sprocket compressing alternate ones of the rollers of the single strand chain between the teeth of the driving and driven sprockets. Substantially no shearing or bending forces will be encountered in the rollers or connecting pins of the chain.

Thus, it is an object of this invention to provide a chain coupling that transmits rotational movement from one shaft to another shaft in such a manner that the primary forces exerted on the chain are compression forces on the chain rollers.

Another object of this invention is to provide a chain coupling that permits a substantial amount of angular and axial shaft misalignment and shaft end-float.

Another object of this invention is to provide a chain coupling that is inexpensive to manufacture, easy to assemble, easy and inexpensive to maintain, and adaptable to various situations.

Other objects, features and advantages of the present invention will become apparent upon reading the following specification, when taken in conjunction with the accompanying drawing.

Description of the preferred embodiments

Figure 1:
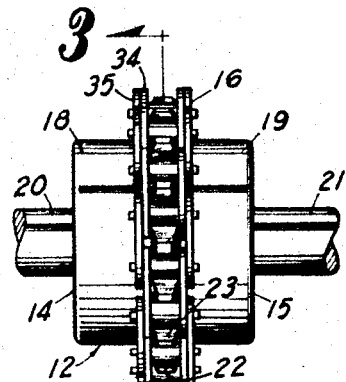
FIGURE 1 is a side elevational view of the chain coupling.
Figure 2:
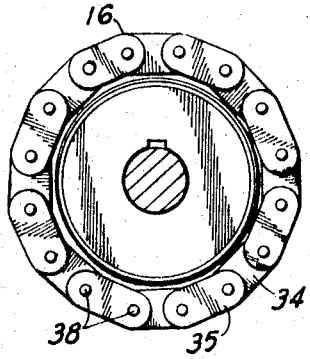
FIGURE 2 is an end view of the chain coupling.
Figure 3:
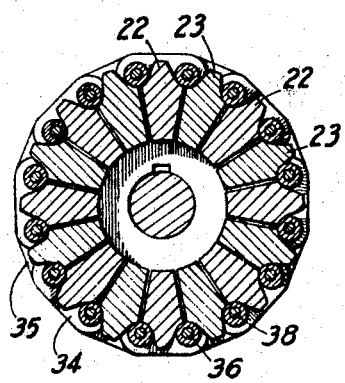
FIGURE 3 is an end cross-sectional view of the chain coupling, taken along lines 3—3 of FIGURE 1.
Figure 4:
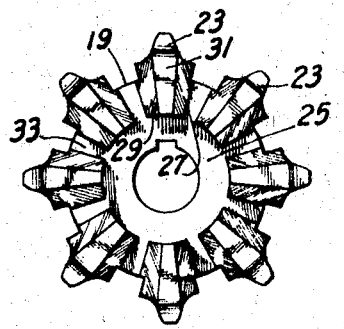
FIGURE 4 is an end view of one of the sprockets of the chain coupling.
Figure 5:
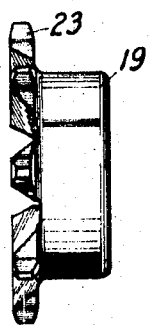
FIGURE 5 is a side elevational view of one of the sprockets of the chain coupling.

Referring now more particularly to the drawing, in which like numerals indicate like parts throughout the several views, FIGURE 1 shows chain coupling 12 which includes sprockets 14 and 15, and chain 16. Sprockets 14 and 15 are identical and include hubs 18 and 19 which are connectable by means of a set screw, or the like, to shafts 20 and 21. A plurality of teeth extend radially outwardly from each hub 18 and 19, teeth 22 being attached to hub 18, and teeth 23 being attached to hub 19. The teeth of each hub are spaced about the inner face of the hub, so that gaps appear between each of the teeth. As is shown in FIGURES 4 and 5, teeth 23 of hub 19 extend from the inner face 25 of the hub along the rotational axis of the hub, and extend radially outwardly of the rotational axis. The base or root of each tooth is inwardly tapered on each of its sides 27 and 29 from the inner face 25 of hub 19, and terminates with an inner face 31 extending parallel to inner face 25 of hub 19. The dimensions of each tooth, and the angles of its sides 27 and 29 are such that the spaces 33 formed between each tooth 23 are sized and shaped so as to complementary to the tooth itself. Therefore, when sprockets 14 and 15 are positioned in face to face relationship, the teeth of the sprockets will fit into the spaces between the teeth of the other sprocket. This relationship is illustrated in FIGURES 1 and 3. When the sprockets are fitted together in this manner, the teeth of each sprocket will lie in a common plane.

Chain 16 is a conventional roller chain and includes inner and outer links 34 and 35, rollers 36 (FIGURE 3) and connecting pins 38. Chain 16 is a single strand, or single roller chain, and is positioned about sprockets 14 and 15 so that its rollers 36 extend into the spaces between the teeth of the sprockets (FIGURE 3).

Figure 6:
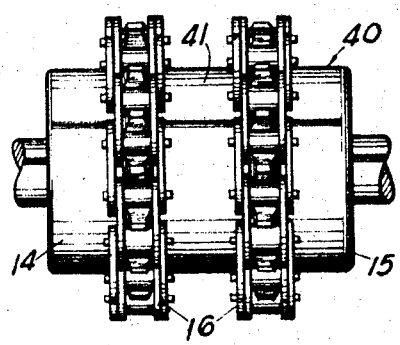
FIGURE 6 is a side elevational view of a double chain coupling.
Figure 7:
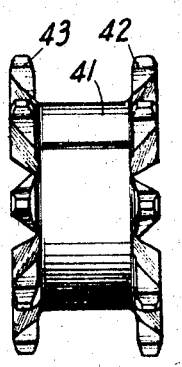
FIGURE 7 is a side elevational view of a double sprocket of the double chain coupling.

As is shown in FIGURES 6 and 7, a compound or double chain coupling 40 can be created with the use of a double sprocket 41. Double sprocket 41 is similar to sprockets 14 and 15, but includes a double row of teeth, teeth 42 extending radially outwardly from one face of the sprocket, and teeth 43 extending radially outwardly from the opposite face of the sprocket. Teeth 42 and 43 are identical to the teeth shown in FIGURES 3–5, and will mate with the teeth of the sprockets shown in FIGURES 4 and 5. Double sprocket 41 can be inserted between sprockets 14 and 15 (FIGURE 6), and a pair of chains 16 draped around the mated teeth. With this arrangement, a double chain coupling is created which allows for more angular and axial shaft misalignment and shaft end-float or offset, as will be explained later.

Figure 8:
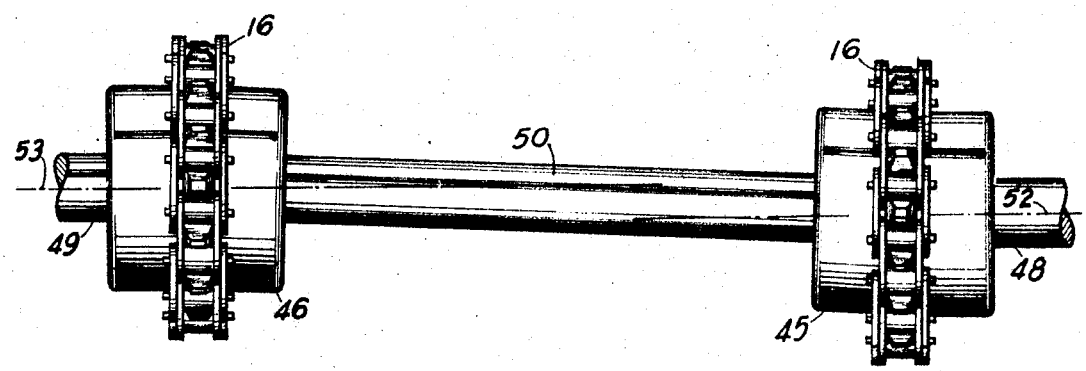
FIGURE 8 is a side elevational view of a tandem sprocket chain coupling.

As is shown in FIGURE 8, a tandem chain coupling, or a series of chain couplings 45 and 46 can be arranged between the primary driving shaft 48 and the ultimate driven shaft 49. The intermediate shaft or shafts 50 serve to connect primary driving shaft 48 to ultimate driven shaft 49. This arrangement is useful when driving shaft 48 is spaced a considerable distance away from driven shaft 49, and when shaft misalignment is excessive. For instance, when the axis 52 of shaft 48 is substantially parallel to but offset from the axis 53 of shaft 49, intermediate shaft 50 will intersect these axes. The loose fit of chain 16 is sufficient to allow the teeth of couplings 45 and 46 to wander between the links of a chain a sufficient distance to allow for the angle at which shaft 50 must make with each of shafts 48 and 49. Also, the loose fit of chain 16 in FIGURE 8, or in any of the other figures, is sufficient to allow for some improper alignment of the teeth of the sprockets, as when the teeth of one sprocket are not inserted fully into the spaces of the other sprocket, or when the teeth of the sprockets are inserted against the inner face of the opposite sprocket. Also, while FIGURE 8 shows an emphasized offset of axes 52 and 53 of shafts 48 and 49, a smaller but significant offset of the axes of the driving and driven shaft of a single chain coupling can be accommodated by the looseness of the chain, and by the loose fit of the teeth of the adjacent sprockets in the spaces of the sprockets.

Figure 9:
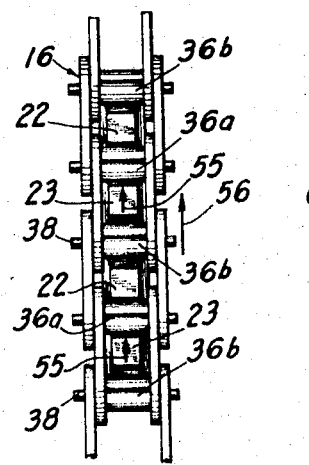
FIGURE 9 is a schematic view of the chain, driving teeth and driven teeth of the chain coupling.

As is shown in FIGURE 9, teeth 23 of driving sprocket 15 will be driven in the direction indicated by arrows 55. Teeth 23 will engage alternate ones of the rollers 36 of chain 16, to cause the chain to be driven in the direction as indicated by arrow 56. Alternate rollers 36a will engage teeth 22 of sprocket 12, thereby imparting motion to sprocket 12 also in the direction as indicated by arrow 56. In the meantime, the other alternate teeth, teeth 36b, will not be contacted by any of the teeth 22 or 23. With this arrangement, it can be seen that alternate rollers 36a transmit the force from teeth 23 to teeth 22, and thus, the force from driving sprocket 15 to driven sprocket 14. The remaining elements of chain 16 merely function to hold the chain in position about the mated sprockets 14 and 15. Thus, the forces encountered by chain 16 are primarily compressive forces on alternate sprockets 36a.

When the rotational movement of driving sprocket 15 is reversed, teeth 23 will move in the direction opposite from that indicated by arrows 55, to move chain 16 in the direction opposite from that indicated by arrow 56. Teeth 23 will engage rollers 36b, and rollers 36b will then engage teeth 22 of driven sprocket 14. Thus, teeth 36b will encounter the compressive forces, while teeth 36a will not be contacted by any of the teeth of the sprockets. Thus, no matter which direction driving sprocket 15 is driven in, the forces felt by chain 16 will be primarily only the compressive forces encountered by rollers 36a or 36b.

Figure 10:
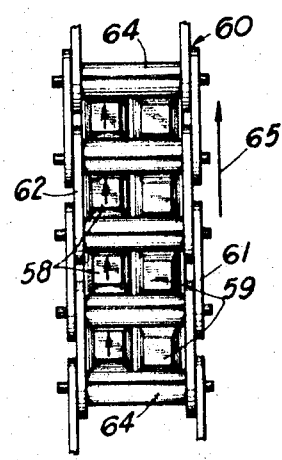
FIGURE 10 is a schematic view, similar to FIGURE 9, but showing the chain, driving teeth and driven teeth of a typical prior art single strand roller chain coupling.

FIGURE 10 illustrates the forces encountered by the chain of a typical chain coupling utilizing a single strand roller chain. The sprockets of the coupling are placed in face to face relationship, and their teeth 58 and 59 do not occupy a common plane. When a single strand or single roller chain 60 is utilized to connect the sprockets together, as is shown in FIGURE 10, teeth 58 and 59 of both sprockets will be positioned between the side links 61 and 62 of the chain. When teeth 58 of the driving sprocket are rotated with the sprocket to drive the chain, driving teeth 58 will engage each roller 64, to move chain 60 in the direction as indicated by arrow 65. Driven teeth 59 are displaced to the side of driving teeth 58, and are driven by rollers 64. Because of this lateral displacement of driven teeth 59 from driving teeth 58, it will be seen that considerable shearing and bending forces are encountered by rollers 64. The primary forces felt by rollers 64 will be shearing forces.

Figure 11:
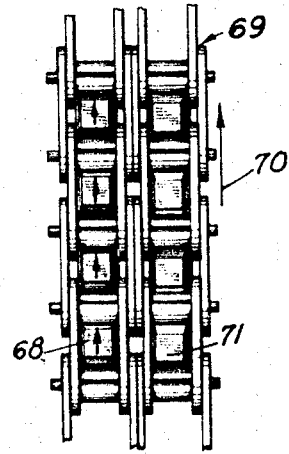
FIGURE 11 is a schematic view, similar to FIGURES 9 and 10, but showing the chain, driving teeth and driven teeth of a typical prior art double strand roller chain coupling.

When a double strand roller chain is utilized to connect the sprockets together, as is schematically shown in FIGURE 11, substantially the same problems occur as shown in FIGURE 10, except that the shearing forces will be felt primarily by the connecting pins instead of the rollers. Driving teeth 68 drive chain 69 in the direction as indicated by arrow 70, and chain 69 drives driven teeth 71. Since a double strand chain having two rollers in each chain link is utilized, the connecting pins of each chain link function to hold the strands of the chain together. When the double strand chain is utilized in the manner as shown in FIGURE 11 to connect sprockets together, tremendous shear forces are felt by each connecting pin. The connecting pins must, of necessity, be of relatively small diameter. The necessary displacement of driving teeth 68 from driven teeth 71 is such that a long lever arm is felt by each connecting pin, thereby compounded the structural inadequacies of the arrangement.

At this point, it should be apparent that the invention disclosed herein comprises a substantial improvement over the typical chain couplings, as schematically illustrated by FIGURES 10 and 11. The torque between the driving and driven shafts 21 and 20 is transmitted through the chain rollers, primarily through direct compression force of the roller, as compared to a shearing force on the roller (FIGURE 10), or on the chain pins (FIGURE 11). The torque limitation between the driving and driven sprockets therefore depends on the crushing strength of the chain rollers, the root strength of the teeth of the sprocket, and the diameter of the sprocket. The disclosed chain coupling is easier and faster to assemble than those illustrated in FIGURES 10 and 11, since a single strand chain is more easily coupled than a double strand chain. The two sprockets intermeshed together to form a single row of teeth are readily aligned with each other when the driving and driven shafts are being aligned, while the sprockets of a standard chain coupling must be carefully positioned together to assure proper shaft alginment. The double coupling or universal coupling shown in FIGURE 6 is constructed to provide a minimum link chain assembly, while still allowing axial movement, angular movement, and axial displacement of the driving and driven shafts.

While the chain illustrated with the various ones of the couplings has been disclosed as a typical roller chain, various other chains can be utilized with the coupling. The chain may have special wide or narrow rollers. Since the force transmitted between the driving and driven teeth is primarily compressive forces on the rollers of the chain, the chain utilized may have longer rollers without danger of chain breakage or binding. The teeth of the driving sprocket can be angularly or axially displaced for some distance from the teeth of the driven sprocket before the force between these teeth is transformed from compression forces on the rollers to shearing forces. The only requirement is that at least a portion of the mass of the driving teeth follows at least a portion of the mass of the driven teeth. Thus, the length of the rollers of the chain can be almost twice the width of the teeth of the driving and driven rollers.

If it is desired to have an extremely flexible chain coupling so that a large angle can be created from time to time between the driving and driven shafts of the coupling, one of the sprockets of the coupling can have wider teeth than the other sprocket, so that the sprocket with the narrower teeth will be maintained within the chain with a loose fit, thereby allowing substantial pivotal movement of the sprocket within the confines of the chain. Since the teeth of the other sprocket will be substantially as wide as the length of the rollers, the mass of the smaller teeth will always be ahead of, or behind, the mass of the larger teeth, thereby always limiting the forces on the chain rollers to primarily compression forces.

The tapered roots or bases of the teeth of the sprockets is such that maximum strength characteristics is provided for each tooth of each sprocket, in spite of the fact that spaces are provided between adjacent teeth. While different shaped teeth may be utilized in the couplings, teeth having a broad base, as shown in FIGURES 4 and 5, provide maximum strength to the couplings. If it s desired to construct the sprockets so that they will fail at a predetermined torque, the teeth of the sprockets, or of one of the sprockets, can be cut with a configuration which differs from that shown in FIGURES 4 and 5, of a square configuration, for instance. On the other hand, since the teeth of the sprocket are intermeshed, it is possible that the chain of the coupling can break, and the coupling will continue to operate temporarily. In this case, the teeth of the adjacent sprockets would be in contact with each other, instead of in contact with the rollers of the chain.

It will be obvious to those skilled in the art that many variations may be made in the embodiments chosen for the purpose of illustrating the present invention without departing from the scope thereof as defined by the appended claims.

I claim:
1. A coupling for connecting together substantially coaxial shafts comprising first and second sprockets, each including a hub and a plurality of teeth extending radially outwardly of and projecting axially of the hub, each of the teeth being spaced at intervals about each hub a distance sufficient to receive the teeth of the opposite sprocket in meshed relationship with all the teeth being located in a single plane, the sprockets being positioned in meshed relationship and a roller chain engaged about the teeth of both sprockets with a single roller of the chain being located between adjacent teeth.

2. The invention of claim 1 wherein the teeth of each sprocket are formed with a wedge-shaped base, with the larger portion of the base being located adjacent the hub and the smaller portion of the base being displaced axially of the hub, thereby defining wedge-shaped spaces between the teeth.

3. In a coupling for connecting together rotatable, substantially coaxial shafts comprising, a pair of abutting sprockets, and a single strand roller chain engaging the teeth of the sprocket, the improvement therein of each of the teeth of one sprocket being positioned between adjacent ones of the teeth of the other sprocket, at least a portion of all of the teeth of both sprockets being positioned in a common plane, and a single roller of said chain being positioned between adjacent ones of the teeth.

4. In a coupling for connecting together generally coextensive rotatable shafts comprising a sprocket connected to the adjacent ends of each shaft, a single strand roller chain engaging all of the teeth of both sprockets, the improvement therein of means for the driving sprocket to drive the driven sprocket by compressing alternate ones of the chain rollers between the teeth of the driving sprocket and the driven sprocket.

5. A coupling for connecting together the ends of generally coextensive rotatable shafts comprising a pair of sprockets in juxtaposed coaxial relationship, a plurality of radially extending teeth spaced about the hub of each sprocket, the teeth of each sprocket projecting axially from its sprocket toward the other of the sprockets, all the teeth of each sprocket defining spaces therebetween of a size and shape to receive the teeth of the other sprocket so that the teeth of each sprocket occupy a common plane, and a continuous chain member extending about the teeth of both sprockets.

6. The invention of claim 5 wherein said continuous chain comprises a roller chain with a single roller extending between adjacent ones of the teeth of the sprockets.

7. The invention of claim 5 wherein the teeth of each sprocket are projected axially of the hub of the sprocket, and the base of each tooth is tapered in the axial and radial directions.

References Cited
UNITED STATES PATENTS

| | | | |
|---|---|---|---|
| 1,921,144 | 8/1933 | Ahnger | 64—19 |
| 2,080,716 | 5/1937 | Hitchcock | 64—19 |
| 2,655,798 | 10/1953 | Neher | 64—19 X |

FOREIGN PATENTS

| | | |
|---|---|---|
| 115,451 | 5/1918 | Great Britain. |

HALL C. COE, Primary Examiner